(12) United States Patent
Swanson (10) Patent No.: US 8,382,412 B2
(45) Date of Patent: Feb. 26, 2013

(54) APPARATUS FOR FASTENING SINGLE AND MULTIPLE SHEETS AND METHOD FOR USING SAME

(76) Inventor: Jeffrey Stuart Swanson, Stockton, CA (US)

( * ) Notice: Subject to any disclaimer, the term of this patent is extended or adjusted under 35 U.S.C. 154(b) by 273 days.

(21) Appl. No.: 12/757,107

(22) Filed: Apr. 9, 2010

(65) Prior Publication Data

US 2011/0250034 A1  Oct. 13, 2011

(51) Int. Cl.
*F16B 43/00* (2006.01)

(52) U.S. Cl. .............................. 411/368; 52/410; 16/2.1

(58) Field of Classification Search .................. 411/531, 411/371.2, 368, 369; 52/410; 5/417; 135/118; 16/2.1, 2.5
See application file for complete search history.

(56) References Cited

U.S. PATENT DOCUMENTS

| 291,202 | A | * | 1/1884 | Koch | 24/37 |
| 735,753 | A | * | 8/1903 | Gove | 138/98 |
| 1,505,501 | A | * | 8/1924 | Siehl | 24/105 |
| 1,825,029 | A | * | 9/1931 | Trub | 24/105 |
| 1,860,715 | A | * | 5/1932 | Kellogg | 411/409 |
| 2,305,427 | A | * | 12/1942 | Joachim | 411/409 |
| 4,519,172 | A | * | 5/1985 | Ristow | 52/96 |
| 4,520,606 | A | * | 6/1985 | Francovitch | 52/410 |
| 4,620,402 | A | * | 11/1986 | Beneze | 52/410 |
| 4,630,422 | A | * | 12/1986 | Beneze | 52/410 |
| 4,744,187 | A | * | 5/1988 | Tripp | 52/410 |

* cited by examiner

*Primary Examiner* — Flemming Saether (57) ABSTRACT

A method and apparatus comprising providing a temporary or permanent connection of one or multiple sheets of material and providing an attachment point to hold these materials. A mating two part base and cap connected by a central tube connector that securely sandwiches sheet material between the two. The base may have additional passthrough holes for affixation to supports or ground. The connector may be threaded or frictionally attached and may optionally have thumb wings for easy turning. The connector may have one or more wings for easy manipulation. The connector may also be configured to receive various staking means including ones with eyelits or other attachment points and have pass throughs for stable engagement to other structures.

7 Claims, 10 Drawing Sheets

APPARATUS FOR FASTENING SINGLE AND MULTIPLE SHEETS AND METHOD FOR USING SAME

CROSS REFERENCE TO RELATED APPLICATIONS

None

BACKGROUND OF THE INVENTION

This invention relates generally to fastening mechanisms and more particularly to an innovative apparatus for fastening and securing single and multiple sheets and a method for securing same.

SUMMARY OF THE INVENTION

Grommets are well known as a permanent connection point that is not typically applied in the field, and are not removable. Grommets also are usually small in size and require special preparation due to their size to be effective and often require special compression tools. Currently, to hold down sheet material it is tied, nailed, staked, sandbagged, or buried at its edges to secure it. The present invention is designed to provide a new and efficient way of securing permanently or termporarily the sheet material as described above. This connector apparatus also provides for a way of temporally or permanently connecting said materials and increasing the effectiveness of holding these materials by spreading the contact point over a larger area. Other methods of securing this sheet material described above are not as effective as this new technology, due to the limited effectiveness of their ability to securely hold the sheet material The primary advantage of the invention is to provide a better way of attaching a fastener and holding sheets of material.

Another advantage of the invention is to provide a better way of making a strong connection to sheet material.

Another advantage of the invention is to provide a better way of making temporary and permanent connections to sheets of material using a fastener.

Another advantage of the invention is to provide a better way of making quick connections to sheet material.

A further advantage of the invention is to provide a better way of making focal point connections to sheet materials that spread the stress to a greater area. In a preferred embodiment, this may be provided by the contact being made at the center of the tubular connector and being spread to the outer most perimeter contact area through the convex base and the concaved cap, to the sheet material to maximize the effectiveness and strength of the grip on the sheet material.

Yet another advantage of the invention is to provide a way of using the attachment point to provide connection to and through that point.

Still yet another advantage of the invention is to provide a better way to remove and reuse the fastener.

In accordance with a preferred embodiment of the invention, there is disclosed an apparatus for fastening single and multiple sheets of plastic, fabric or sheet material having a domed base having a convex surface with an orifice defined within said surface and passing through said base for engagement of a tubular connector, a domed mating cap having a generally concave inner surface, where the tubular connector has an outer diameter of lesser diameter than said orifice and has two ends with one end matable to a reciprical receiving location in the base, and a second end of said tubular connector has a head portion of greater diameter than the orifice.

In accordance with a preferred embodiment of the invention, there is disclosed an apparatus for fastening single and multiple sheets of plastic, fabric or sheet material having a hollow base having a convex surface with an orifice defined within the surface and passing through the base for engagement of a tubular connector, a cap having a generally concave inner surface for generally mating to the convex surface of the base, the tubular connector having an outer diameter of lesser diameter than the orifice and having two ends with one end threadably engaged to the orifice, and the second end of the tubular connector having a nut fixedly attached on the end and of greater diameter than the orifice.

In accordance with a preferred embodiment of the invention, there is disclosed a method for fastening one or more sheets of material having the steps of placing a base having a convex upper surface on a support or ground, placing sheet material on top of the base, placing a cap having a concave inner surface on the sheet material substantially over the base, piercing the material and inserting a hollow connector through an orifice in the cap and engaging the connector with a mating receptacle in the base, wherein said material is positioned between the cap and the base in stable engagement, and to provide a means to apply pressure for the connection to the sheet material.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
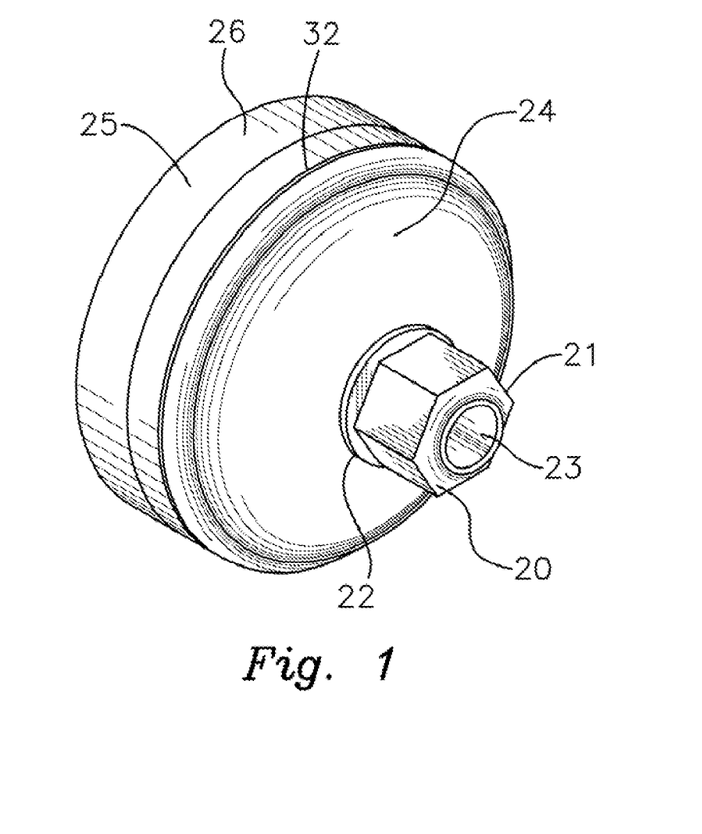
FIG. 1 is a perspective view of a fastener assembly according to a preferred embodiment of the invention.
Figure 4A:
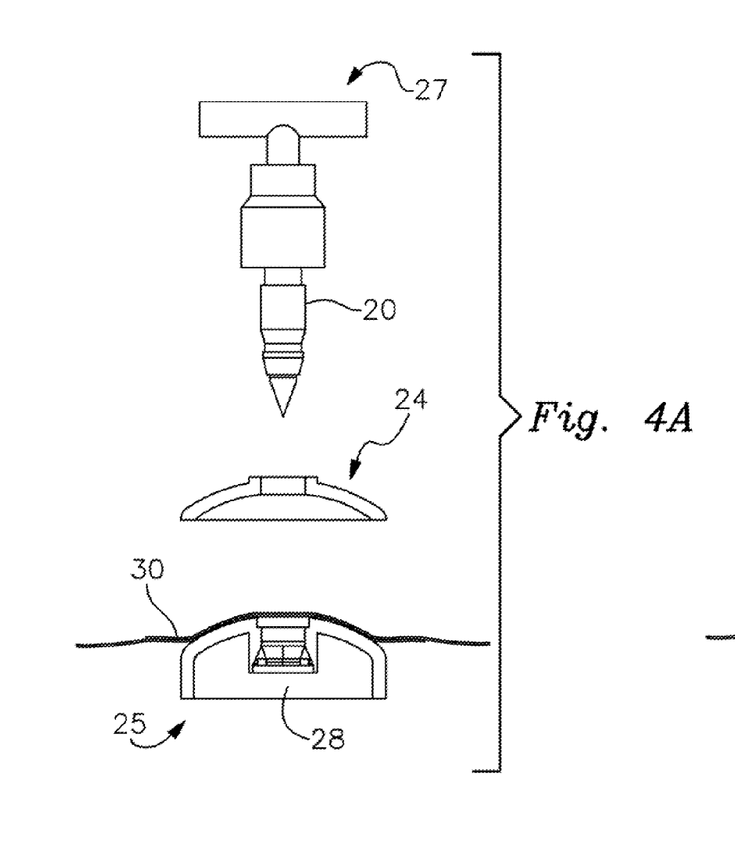
FIGS. 4A and 4B are cross sectional view of two fastener systems with the sheet material prior to fastening according to a preferred embodiment of the invention.
Figure 4B:
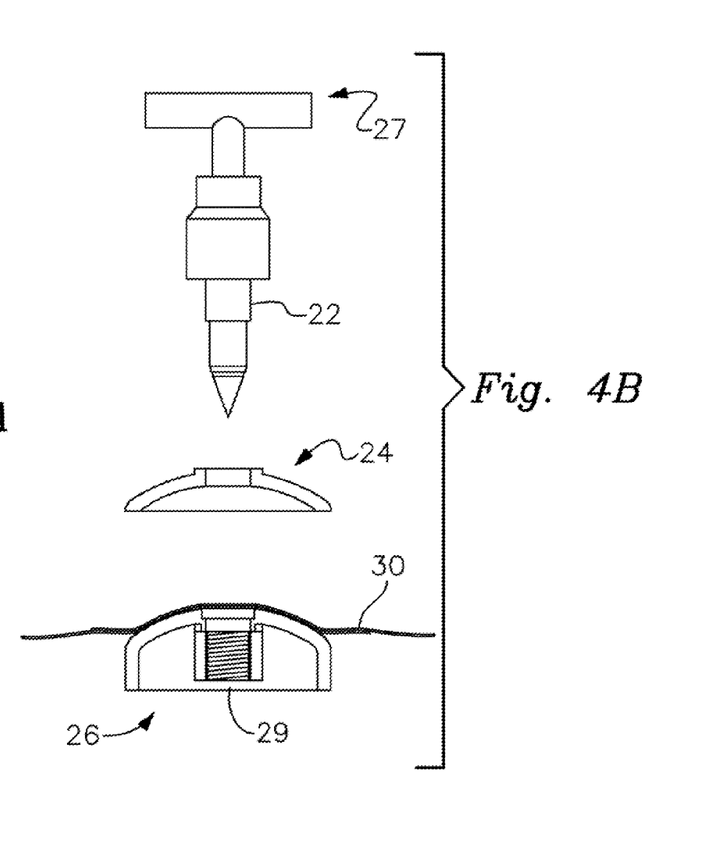

Turning first to FIG. 1, there is shown a perspective view of a fastener apparatus of a preferred embodiment of the invention. Base 25 is preferably placed under a desired sheet material, as shown in FIGS. 4A and 4B, upon which cap 24 will be attached to base 25. As more fully described in connection with FIG. 4, base 25 and cap 24 are of a mating configuration where base 25 is preferably convex and cap 24 is concave. Contact edge 22 is a point of compression at cap 24 upon installation of connector tube 20. Connector tube 20 may be configured in any of a variety of connecting modes including frictional, threaded, or other secure mating between fastener 20 and base 25. In one embodiment, connector tube 20 works in conjunction with the base 25, the tightening nut 21, and the cap 24 to provide the compression at the contact edge 22, to fasten the sheet material between base 25 and cap 24. As more fully described below, connector tube 20 is configured to accept additional connectors or fasteners as shown in FIG. 7.

Figure 2A:
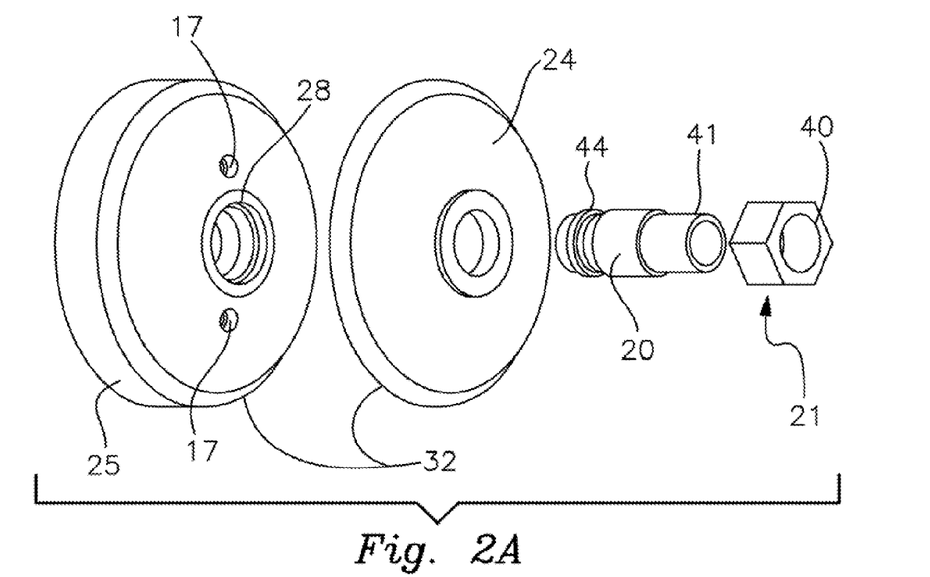
FIGS. 2A and FIG. 2B are exploded perspective views of two fastener types according to a preferred embodiment of the invention.
Figure 2B:
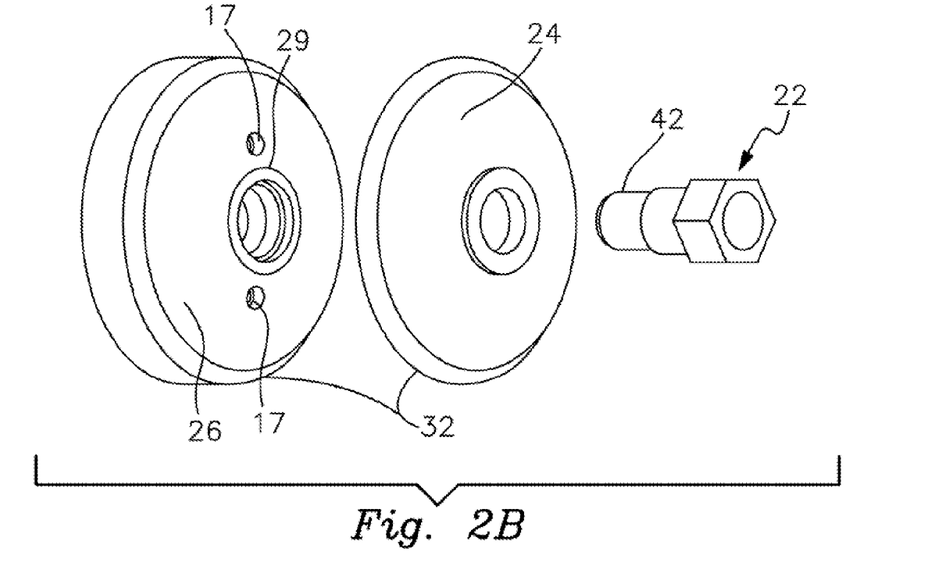

Turning next to FIGS. 2A and 2B, there are shown exploded views of two alternative fasteners of a preferred embodiment of the invention. FIG. 2A shows base 25 and receiving point 28 for mating engagement to injection point 44 of connector tube 20. Base 25 has pass through holes 17 that comprise in one embodiment a threaded cylindrical tube that permits conventional fasteners such as screws to be used to secure base 25 to other structures or the ground. Connector tube 20 is frictionally engaged to mating connection point 28 in FIG. 2A with detents for engagement to injection point 44 that upon engagement result in a secure and tight connection between connector tube 20 and base 25. Connector tube 20 may also have adjustable thread 41 that mates with thread 40 on nut 21 to provide a convenient means for turning connector tube 20 with a wrench. Primary contact point 32 is the peripheral circumferential portions of cap 24 and base 25 that are engaged to each other upon insertion of connector tube 20 and that provide a secure point of contact with sheet material disposed therebetween base 25 and cap 24.

FIG. 2B, shows an alternate fastener base 26 which has adjustable contact thread 29, that receives the thread 42 on the connector tube 22. By engaging connector tube 22 with thread 42 to the inside of cap 26 void having contact thread 29, a secure engagement can be made between cap 24 and base 26.

Figure 2C:
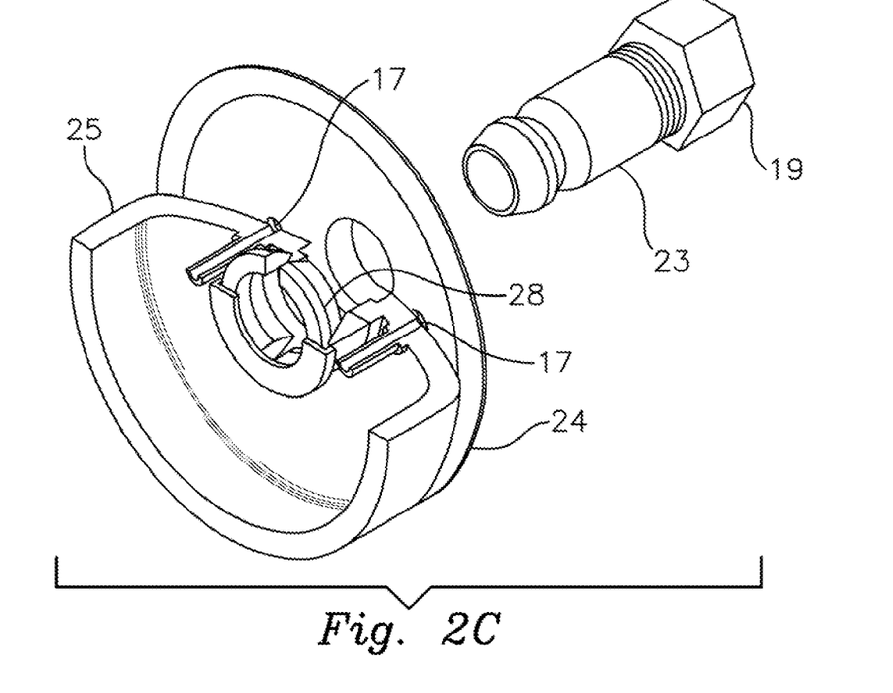
FIGS. 2C and 2D are perspective views of a fasterner type according to a preferred embodiment of the invention.
Figure 2D:
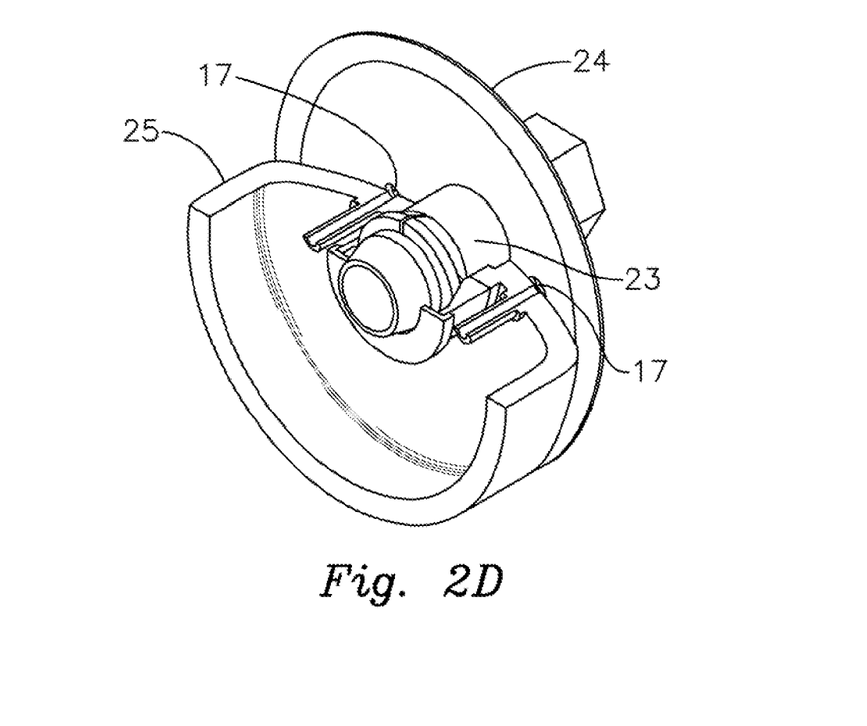
Figure 7A:
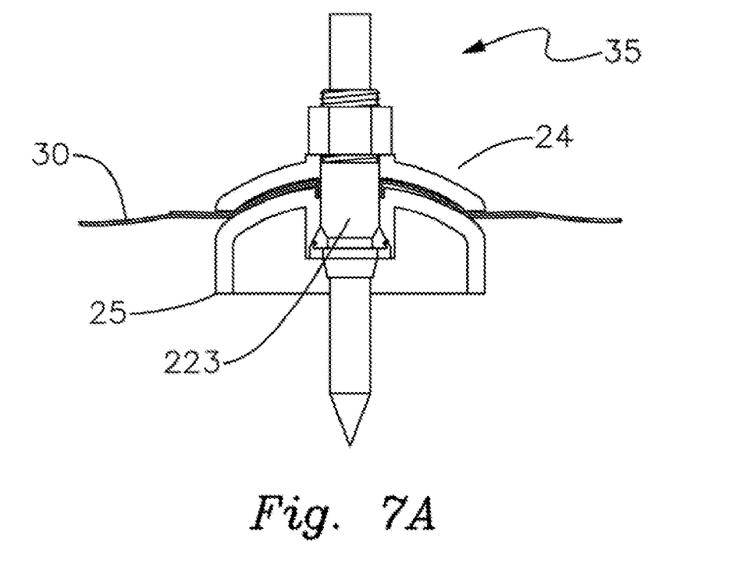
FIGS. 7A and 7B are cross sectional views of two fastener types with securing devices in place according to a preferred embodiment of the invention.
Figure 7B:
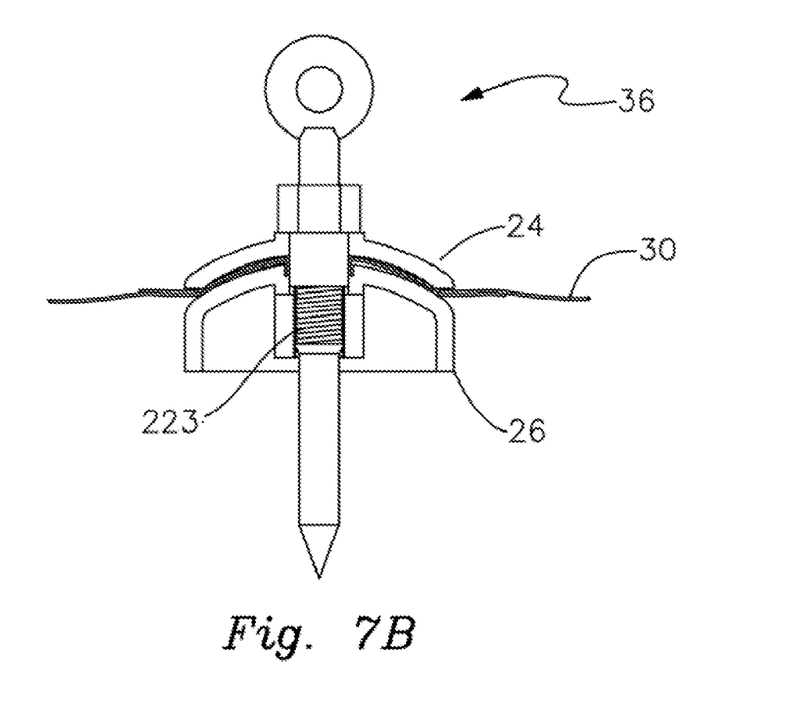

FIGS. 2C and 2D show a partically cutaway perspective view of connector tube assembly 23 that mates with mating connection point 28 by insertion through cap 24 into base 25 as shown in completed connection in FIG. 2D. Passthrough holes 17 extend substantially the depth of base 25 for insertion of screws or other fasteners to secure base 25 to an underlying support, structure or ground. Connector tube assembly 23 provides a hollow tube through which other connectors may be attached as shown in FIGS. 7A and 7B and described more fully in connection therewith. By pressure insertion of connector tube assembly 23 into base 25 at connection point 28 which comprise a series of circumferential rings, connector tube assembly 23 is securely affixed to base 25.

Figure 3:
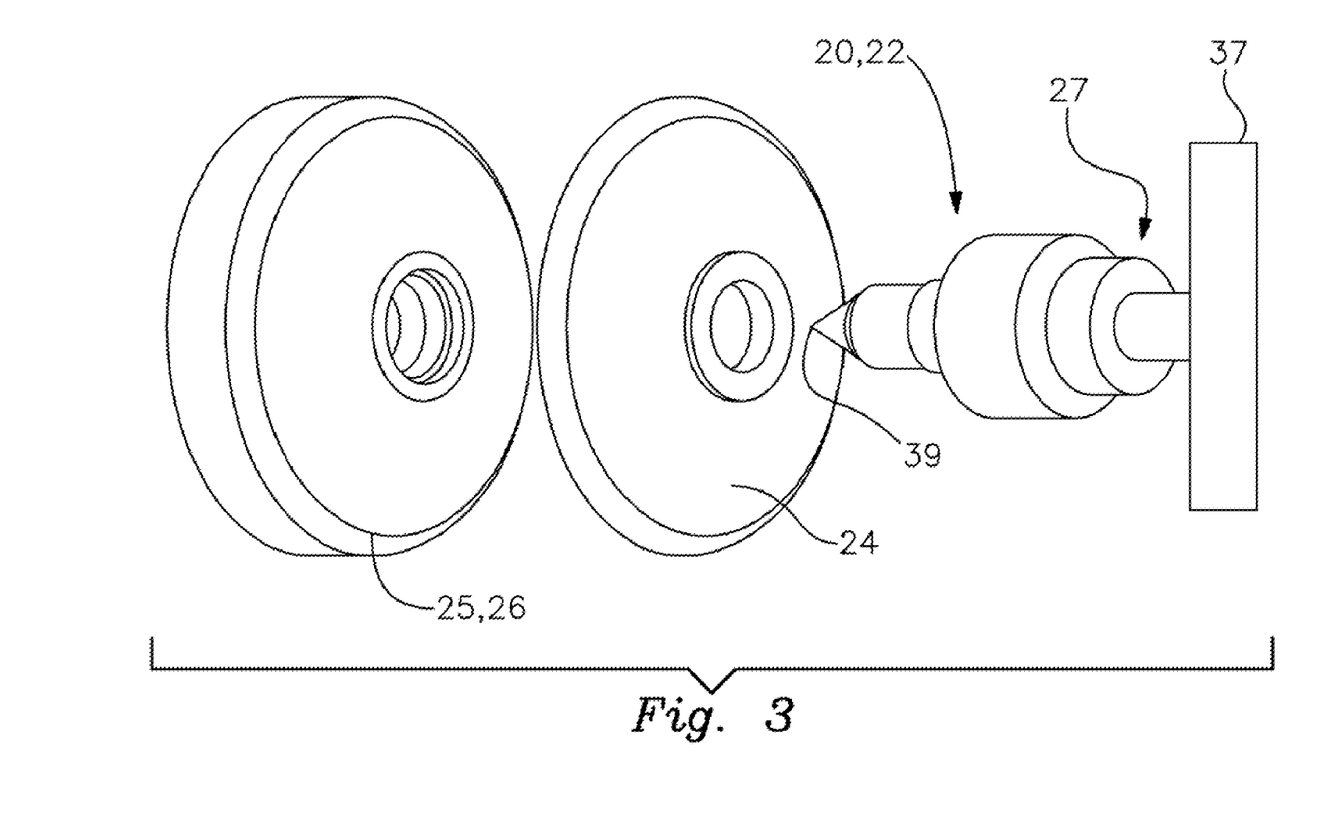
FIG. 3 is an exploded perspective view of the fastener with installation tool according to a preferred embodiment of the invention.

FIG. 3 shows connector tubes 20 or 22 attached to installation tool 27 through a variety of conventional means including a hexagonal nut mating configuration, and aligned with base 25 or base 26 to insert connector tube 20 or 22 through the void in base 25 or base 26 to fasten the base to cap 24. As more fully shown below, a sheet material is positioned between base 25 or base 26 and cap 24 before insertion of connector tube 20 or 22 for stable engagement to the sheet material. Installation tool 27 preferably has a handle 37 and sharp point 39 for piercing the desired sheet material to which the base and cap are attached.

FIG. 4A shows a side cross sectional view of sheet material 30 placed over base apparatus 25 prior to the installation of connector tube 20. Base 25 may be in a preferred embodiment secured to a support or other base before placement of sheet material 30. Connector tube 20 has been mounted on installation tool 27 for insertion through cap 24 and through sheet material 30 into base 25 for engagement to mating connection point 28 as previously described. As tool 27 pierces sheet material 30 it applies pressure to connector tube 20 to engage mating connection point 28. In the method of the invention, base 25 is placed in the desired location under sheet material 30. Cap 24 is attached to base 25 and secures the base and cap to sheet material 30. This permits later use of various staking means as shown in FIG. 7.

FIG. 4B shows a side cross sectional view of sheet material 30 placed over base apparatus 26 prior to the installation of connector tube 22. Connector tube 22 has been mounted on installation tool 27 for insertion through cap 24 and through sheet material 30 into base 26 for engagement to contact thread 29 as previously described. As tool 27 pierces sheet material permits turning of connector tube 22 to engage contact thread 29 in a conventional manner so as to screw connector tube 22 into base 26 at contact thread 29. In the method of the invention, base 26 is placed in the desired location under sheet material 30. Cap 24 is attached to base 26 and secures the base and cap to sheet material 30. This permits later use of various staking means as shown in FIG. 7.

Figure 5A:
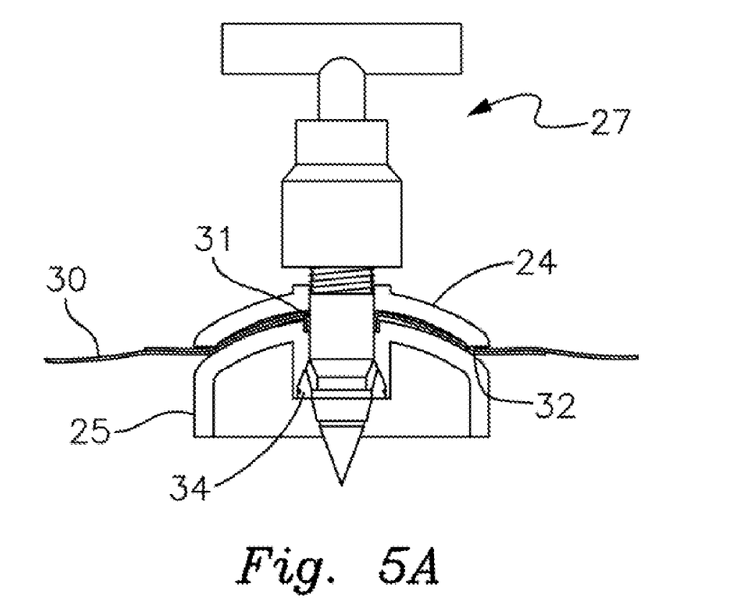
FIGS. 5A and 5B are cross sectional views of two fastener types with the sheet material being pierced with the apparatus components set according to a preferred embodiment of the invention.
Figure 5B:
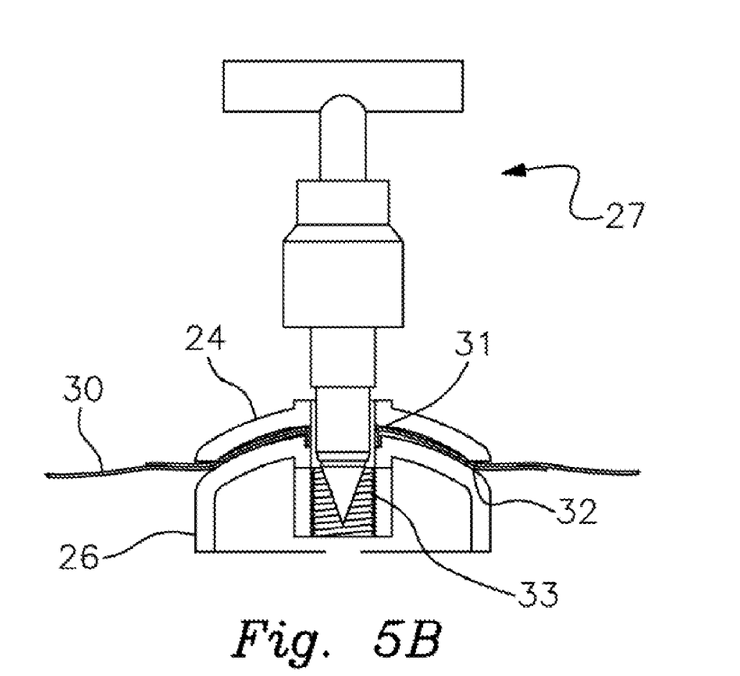

FIGS. 5A and 5B show cross sectional views of two alternative systems according to preferred embodiments of the invention. FIG. 5A shows a fully assembled base and cap using a frictional engagement as shown in FIG. 4A where the connector tube engages detent 34. Cap 24 makes contact along the mating convex surface of base 25 and in a preferred embodiment makes contact about the circumferential line 32 where the edge of cap 24 is pressed onto the top of base 25. Cap 24 is somewhat larger in its radius of curvature than the convex surface of base 25 allowing for flexing of cap 24 when fully pushed down onto base 25. The allows for stable engagement of the cap to the base at the circumferential line 32 for a tighter connection. In certain embodiments, cap 24 may be engages across the entirety of its concave surface with the convex surface of base 25 but may also be principally engaged along circumferential line 32 with a small gap 31 between cap 24 and base 25 inside the circumferential line 32. FIG. 5B shows a similar engagement as shown in FIG. 5A but with a threaded connector at threaded contact 33. Cap 24 is attached to base 26 using installation tool 27 as described above.

Figure 6A:
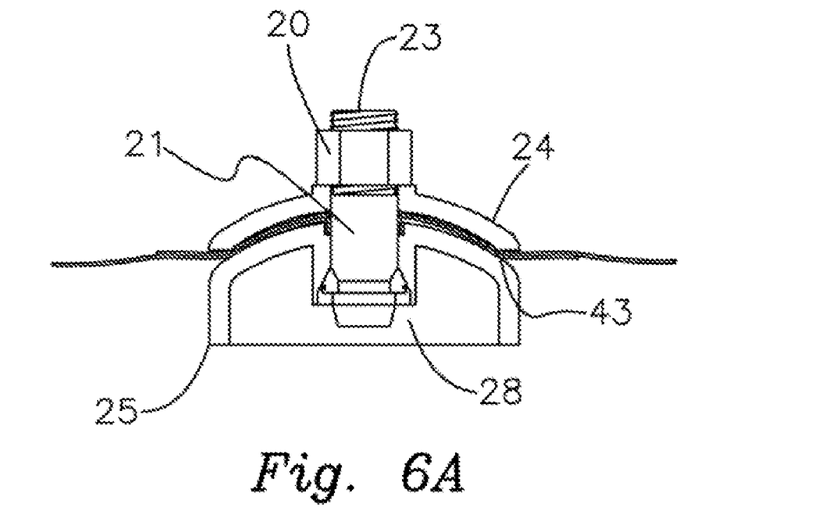
FIGS. 6A and 6B are cross sectional views of two fastener types secured with the installation tool removed according to a preferred embodiment of the invention.
Figure 6B:
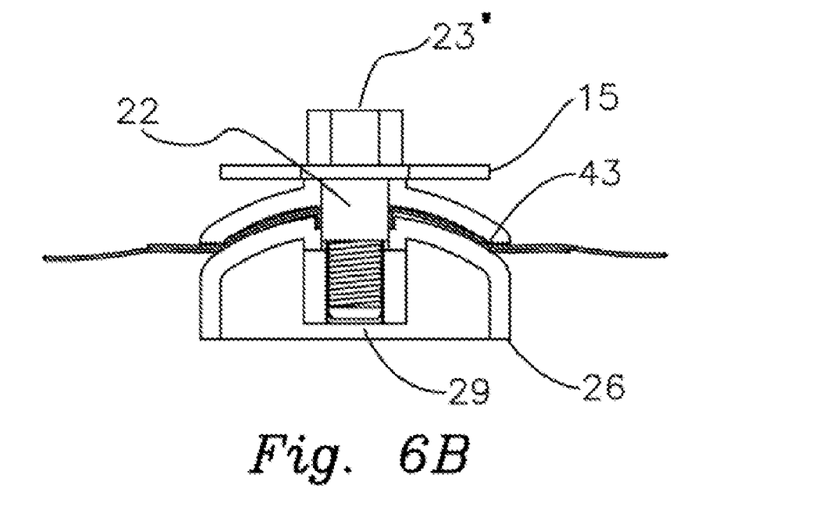

FIGS. 6A and 6B show the completed installation with the sheet material 30 securely fastened and the installation tool removed. Connector tube 21 is frictionally attached at detent 28 to provide stable engagement. Affixed to connector tube 21 is nut 20 to permit further manipulation of the connector tube or its removal. Once attached, cap 24 permits delivery through annulus 23 and 23 40 of other tools such as stakes, posts or alternatively ropes or other tubing. As can be fully appreciated, base 25 and base 26 provide stable support on the base surface over which the sheet material is covering. This may be the ground, or in alternative embodiments other support structures, including decks, concrete, roofs, or virtually any surface that supports the weight of the material and force applied at the point of the base. FIG. 6B shows an alternative connector tube with wings 15 to permit easy grasping of the conector tube for insertion or removal.

Figure 6C:
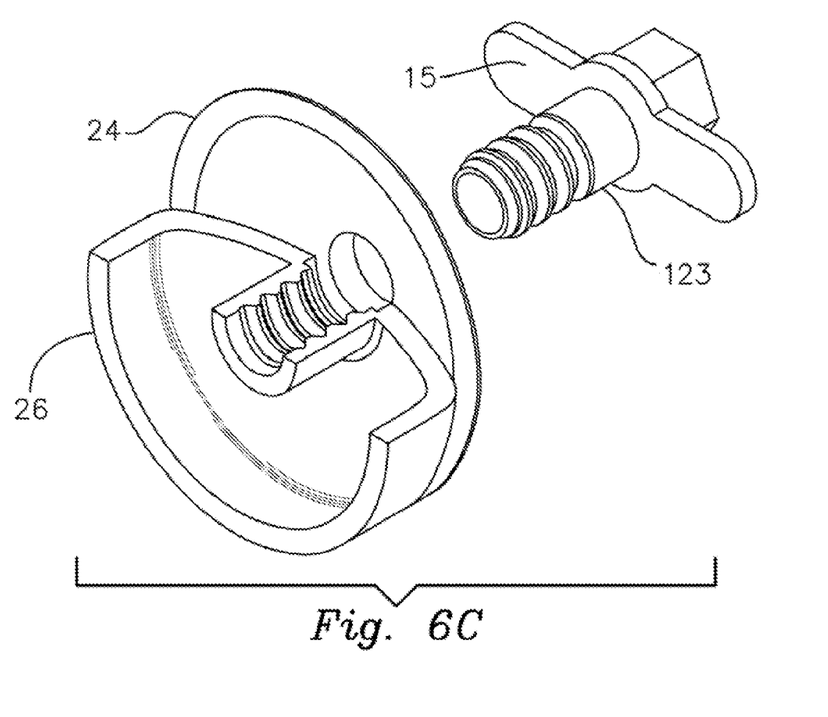
FIGS. 6C and 6D are perspective views of a preferred embodiment of the invention.
Figure 6D:
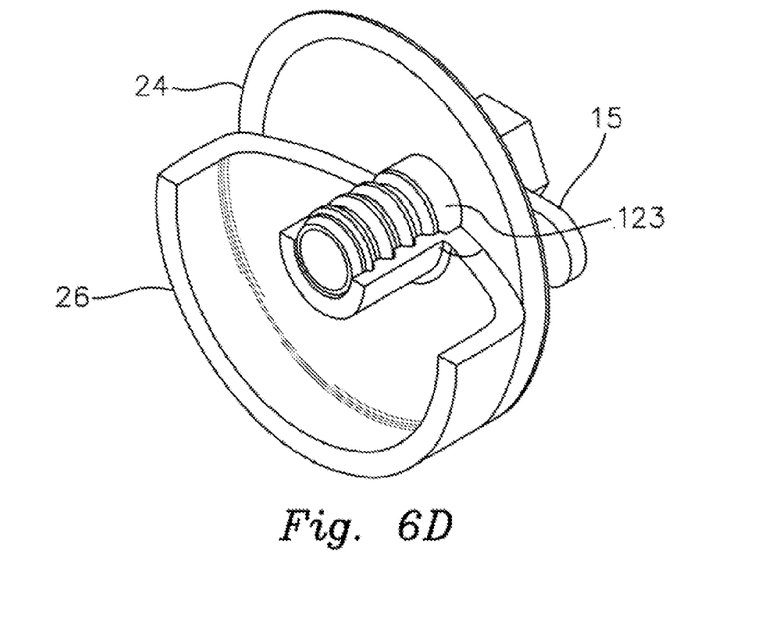

FIGS. 6C and 6D show a partially cutaway perspective view of a threaded version of the connector tube through the cap into the base. Connector tube assembly 123 is shown with wings 15 for easy grasping and manipulation of assembly 123. Wings 15 may be of any variety of configurations including having multiple wings, Curved wings, and vertically oriented wings for grasping. Any of a variety of threading conventions may be used or alternatively frictionally attached as described above when attaching assembly 123 to base 26. In an alternative embodiment, the attachment may utilize ball bearing spring loaded detents (not shown) that would engage the internal circumference a portion of the base and thereby provide stable engagement. In other embodiments, the attachment point may be removable through spring loaded engagement mechanisms well known in the art.

FIG. 7A shows an added optional stake 35 using the tubular connector 223 that provides an additional connection point for other devices, including poles affixed to stake 35. FIG. 7B shows an alternative eyelit stake passing through connector 223 for insertion into the ground or other support surface. The eyelit permits attachment of ropes and other convention tying mechanisms well known in the art.

Figure 8:
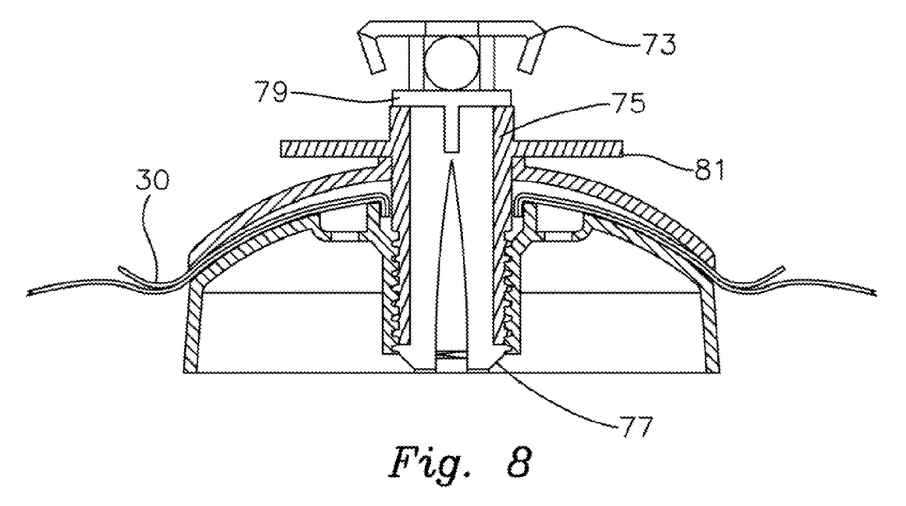
FIG. 8 is a cross sectional view of an alternative fastener and securing device according to a preferred embodiment of the invention.

FIG. 8 shows tie cap 73 as an alternative securing means. Tie cap 73 is integrally engaged to T cap 79 having an extended longitudinal member 77 with detents to engage a threaded portion of base 26 as shown in FIG. 6C. Tie cap 73 has an outside diamter of lesser dimension that the inside diameter of connector tube assembly 75 with wings 81. Connector tube assembly 75 is threaded into the base as previously described with the use of wings 81 to more easily turn connector tube assembly 75 into the threads. After insertion of connector tube assembly 75, the user may insert tie cap 73 by pushing it into the central bore of connector tube assembly 75 and engaging detents 77 at the bottom of the threaded portion of the base. Tie cap 73 is configured for easy attachment of ropes or other tying mechanism. If desired tie back 73 may be removably engaged to T cap 79 for easy insertion and removal.

While the invention has been described in connection with preferred embodiments, it is not intended to limit the scope of the invention to the particular form set forth, but on the contrary, it is intended to cover such alternatives, modifications, and equivalents as may be included within the spirit and scope of the invention as defined by the issued claims.

What is claimed is:

1. A apparatus for fastening single and multiple sheets of plastic, fabric or sheet material comprising:
    a domed base having a convex surface with an orifice defined within said surface and passing through said base engages a tubular connector;
    said tubular connector adapted to receive a stake, pole or other cylindrical member;
    a domed mating cap having a generally concave inner surface;
    said tubular connector having an outer diameter of lesser diameter than said orifice and having two ends with one end matable to a reciprical receiving location in said base; and
    said second end of said tubular connector having a head portion of greater diameter than said orifice.

2. A apparatus for fastening single and multiple sheets of plastic, fabric or sheet as claimed in claim 1 further comprising reciprocal threading on said connector and said base.

3. An apparatus for fastening one or more sheets of material comprising:
    a base having a convex upper surface on a support or ground;
    a cap having a concave inner surface on said sheet material substantially over said base
    a hollow connector having two ends for engaging said cap and base through a central aperture in said cap and base, wherein said connector is adapted to receive a generally cylindrical member; and
    said connector having at least two wings affixed on one of said ends.

4. An apparatus for fastening one or more sheets of material as claimed in claim 3 further comprising a threaded connector and a mating threaded receptacle in said base.

5. An apparatus for fastening one or more sheets of material as claimed in claim 3 wherein said connector frictionally adheres to a mating receptacle in said base.

6. An apparatus for fastening one or more sheets of material as claimed in claim 3 wherein said base and said cap engage along a circumferential line above and below said sheet material upon engagement of said connector.

7. An apparatus for fastening one or more sheets of material as claimed in claim 3 further comprising a second connector tube inserted into said first connector that engages the bottom of said first connector by extended detents.

* * * * *